United States Patent [19]

Tippett

[11] Patent Number: 5,368,923
[45] Date of Patent: Nov. 29, 1994

[54] LAMINATED COMPOSITE WITH ADHESIVE CARRIER ELEMENT

[75] Inventor: Stephen W. Tippett, Bedford, N.H.

[73] Assignee: Textiles Coated International, Amherst, N.H.

[21] Appl. No.: 14,357

[22] Filed: Feb. 5, 1993

[51] Int. Cl.$^5$ .................. B32B 7/10; B32B 27/08; B32B 31/08; C09J 127/18
[52] U.S. Cl. .................. 428/238; 156/306.6; 156/313; 428/239; 428/246; 428/251; 428/285; 428/286; 428/340; 428/341; 428/421; 428/422
[58] Field of Search .............. 428/238, 239, 246, 251, 428/285, 286, 340, 341, 421, 422; 156/306.6, 313

[56] References Cited

U.S. PATENT DOCUMENTS

| | | |
|---|---|---|
| 2,833,686 | 5/1958 | Sandt . |
| 3,086,071 | 4/1963 | Preston . |
| 3,159,609 | 12/1964 | Harris et al. . |
| 3,446,686 | 5/1969 | Butler et al. . |
| 3,513,064 | 5/1970 | Westley . |
| 3,547,765 | 12/1970 | Snyder et al. . |
| 3,579,370 | 5/1971 | Punderson et al. . |
| 3,616,177 | 10/1971 | Gumerman . |
| 3,623,903 | 11/1971 | Dislich . |
| 3,695,967 | 10/1972 | Ross .................................. 156/209 |
| 3,899,622 | 8/1975 | Geiger . |
| 3,928,703 | 12/1975 | Cook . |
| 4,013,812 | 3/1977 | Geiger . |
| 4,090,726 | 5/1978 | Mischel . |
| 4,104,095 | 8/1978 | Shaw . |
| 4,165,404 | 8/1979 | Quehl . |
| 4,168,298 | 9/1979 | Fitzgerald . |
| 4,194,041 | 3/1980 | Gore et al. . |
| 4,272,851 | 6/1981 | Goldstein . |
| 4,327,893 | 5/1982 | Bachmann et al. . |
| 4,347,268 | 8/1982 | Close . |
| 4,399,183 | 8/1983 | Withers . |
| 4,421,878 | 12/1983 | Close . |
| 4,423,183 | 12/1983 | Close . |
| 4,443,511 | 4/1984 | Worden et al. . |
| 4,452,848 | 6/1984 | Geiger . |
| 4,487,878 | 12/1984 | Vasta . |
| 4,490,501 | 12/1984 | Vasta . |
| 4,493,311 | 1/1985 | Bachmann . |
| 4,493,342 | 1/1985 | Bachmann . |
| 4,495,247 | 1/1985 | Vasta . |
| 4,495,248 | 1/1985 | Vasta . |
| 4,506,054 | 3/1985 | Vasta . |
| 4,511,162 | 4/1985 | Broyles . |
| 4,555,543 | 11/1985 | Effenberger et al. . |
| 4,582,296 | 4/1986 | Bachmann . |
| 4,610,918 | 9/1986 | Effenberger et al. . |
| 4,654,235 | 3/1987 | Effenberger et al. . |
| 4,732,413 | 3/1988 | Bachmann et al. . |
| 4,749,168 | 6/1988 | Maxwell et al. . |
| 4,770,927 | 9/1988 | Effenberger .................. 428/245 |
| 4,824,511 | 4/1989 | Hartman ........................ 156/333 |
| 4,883,716 | 11/1989 | Effenberger .................. 428/421 |
| 4,886,689 | 12/1989 | Kotliar ............................ 428/35.7 |
| 4,943,473 | 7/1990 | Sahatjian et al. . |
| 5,106,673 | 4/1992 | Effenberger .................. 428/216 |
| 5,230,937 | 7/1993 | Effenberger .................. 428/113 |

OTHER PUBLICATIONS

Goldman, Edward J., Robert A. Rosenberg and Warren E. Lee, "How to Use Fluorocarbon Plastics as Bonding Agents", *Adhesives Age*, Feb. 1967, pp. 30–34.

Primary Examiner—James C. Cannon
Attorney, Agent, or Firm—Samuels, Gauthier & Stevens

[57] ABSTRACT

A laminated composite comprising first and second components, and a bonding interlayer interposed between the first and second components. The bonding interlayer includes a non-fluoroplastic carrier element coated with a fluoroplastic which melts under conditions of elevated temperature and pressure to effect a bond between the first and second components. The tensile strength of the carrier element is less than the combined tensile strengths of any substrates included in the first and second components.

12 Claims, 1 Drawing Sheet

LAMINATED COMPOSITE WITH ADHESIVE CARRIER ELEMENT

BACKGROUND OF THE INVENTION

1. Field of the Invention

This invention relates to laminated composites including both fluoroplastic and non-fluoroplastic components bonded together by means of a melt bondable fluoropolymer adhesive, and is concerned in particular with a means for more efficiently applying and effectively utilizing the adhesive.

2. Description of the Prior Act

Melt-bondable fluoroplastic adhesives are well known, and widely utilized in the lamination of various components, including both fluoroplastics and non-fluoroplastics. Typical examples of such adhesives include perfluoroalkoxy (PFA) and fluorinated ethylene propylene (FEP).

Conventionally, as a preliminary step in the lamination process, such adhesives are either integrally applied as coatings to one or both of the components being laminated, or films of the adhesives are interposed between the components. The materials are then subjected to elevated temperatures and pressures, thus causing the adhesive to melt and effect a bond at the interface between the associated components. When applying adhesive coatings to woven fabrics and/or porous components such as fiberglass mats, the adhesive coatings tend to penetrate into fabric interstices and surface voids. Thus, much of the adhesive migrates away from the bond interface and is therefore ineffective in creating adhesion during lamination. Since melt-bondable adhesives are some of the more expensive components of most laminates, this inefficient material utilization unnecessarily increases costs. Woven fabric flexibility can also be seriously compromised by interfiber adhesion resulting from penetration of the adhesive into fabric interstices and voids.

Films also exhibit a tendency to migrate away from bond interfaces. Also, minimum film thicknesses are dictated, in large part, by handling requirements as opposed to efficient adhesive utilization. Here again, therefore, excessive adhesive material is employed, with concomitant disadvantageous increases in product costs.

A primary objective of the present invention is to improve the manner in which melt bondable fluoropolymer adhesives are delivered to, and positioned at, the bond interface between components being laminated together.

A companion objective of the present invention is to minimize the amount of melt bondable adhesive required to effect lamination between components, at least one of which is a non-fluoropolymer.

SUMMARY OF THE INVENTION

In preferred embodiments to be hereinafter described in greater detail, these and other objects and advantages are achieved by coating a melt bondable fluoropolymer adhesive onto a carrier element, and by then employing the thus coated carrier element as a bonding interlayer interposed between components. The carrier element serves primarily as a delivery mechanism, and as such advantageously has a minimum tensile strength which is less than the combined tensile strengths of the components between which it is employed to effect lamination. Preferably, the carrier element comprises a woven textile, and the melt-bondable adhesive comprises a coating of FEP or PFA. Adhesive coatings are applied to the carrier element in minimum quantities designed specifically to effect adequate adhesion at the bond interface, with handling considerations being secondary and satisfied primarily by the carrier element.

The invention is especially useful in, although not limited to, the lamination of composites for use in high temperature highly corrosive environments, e.g., as materials used in the fabrication of expansion joint components in power plants and other like industrial installations. Here, corrosively resistant fluoropolymer components such as films of polytetrafluoroethylene (PTFE) can be combined by means of melt bondable adhesively coated carrier elements with non-fluororpolymer heat resistant materials such as uncoated fiberglass mats. The resulting laminate is arranged in a manner such that the PTFE serves as a corrosion barrier protected from high temperature degradation by the fiberglass.

DETAILED DESCRIPTION OF THE INVENTION

Figure 1:
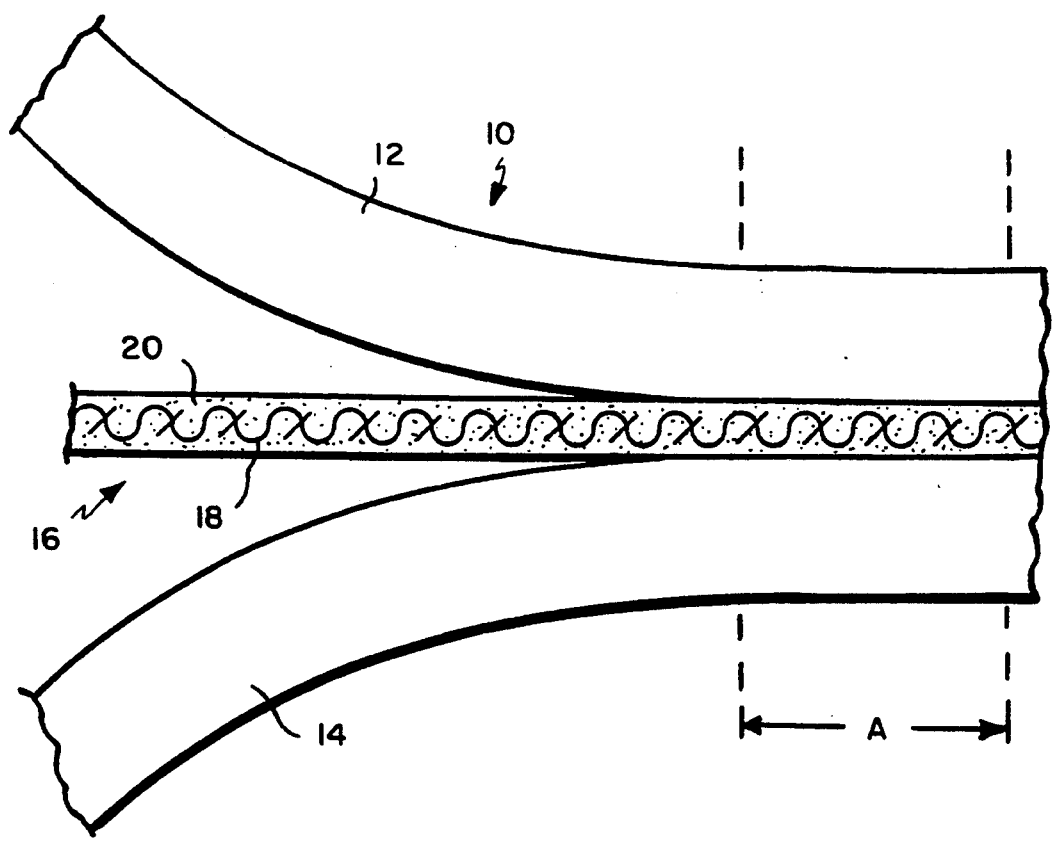
FIG. 1 is a cross-sectional view of the components of a typical laminate incorporating a bonding interlayer in accordance with the present invention.

As shown in FIG. 1, a laminated composite 10 of the invention is comprised of a component 12 comprising a woven fiberglass material which includes fluoropolymer resins laminated to a fiberglass fabric component 14 by means of a bonding interlayer 16 interposed therebetween. The components 12, 14 are laminated together in zone A under conditions of elevated temperature and pressure. The bonding interlayer 16 includes a non-fluoropolymer carrier element 18 (such as scrim fiberglass) coated with a melt bondable fluoropolymer adhesive 20 (such as PFA).

Possible carrier elements include styles 116, 1080 and 1528 fiberglass fabrics available from JPS Glass Fabrics of Slater, South Carolina, as well as scrim fiberglass fabric available from Bay Mill Ltd. of Midland, Ontario. Table A is illustrative of typical PFA coatings applied to such carrier elements.

TABLE A

| carrier element | greige weight oz/sq yd | PFA weight oz/sq yd | coated weight oz/sq yd | warp × fill tensile strengths (lb/in × lb/in) |
|---|---|---|---|---|
| Style 116 fiberglass | 3.16 | 5.99 | 9.15 | 150 × 140 |
| Style 1080 fiberglass | 1.45 | 1.75 | 3.20 | 100 × 42 |
| Style 1528 fiberglass | 6.00 | 6.80 | 12.80 | 250 × 200 |
| scrim fiberglass with yarn count of 10 × 9 | 1.50 | 1.50 | 3.00 | 80 × 70 |

Style 104 fiberglass fabric having a greige weight of 0.58 oz/sq yd, available from Clark-Schwebel Fiber Glass Corporation of White Plains, N.Y., may also serve as the carrier element.

EXAMPLE 1

As illustrated in FIG. 1, a style 2025 fiberglass fabric 14 having a greige weight of 17.7 oz/sq yd, available from JPS Glass Fabrics was laminated to TEXCOAT 700 Expansion Joint Material product 12 available from Textiles Coated, Inc. of Amherst, N.H. The two components were laminated together by means of a bonding interlayer 16 placed between the components prior to lamination.

The TEXCOAT 700 product is a woven fiberglass material which includes fluoropolymer resins, and which typically has the following properties: weight 34 oz/sq yd, thickness 0.030 inches, and warp×fill tensile strengths of 700 lb/in×700 lb/in.

The bonding interlayer was produced by coating an aqueous dispersion of MFA (HYFLON latex) PFA available from Ausimont USA, Inc. of Morristown, N.J., onto the style 1080 fiberglass fabric carrier element described in Table A. The latex solids constituted 60% by weight. The coated fabric was dried and sintered in a tower at a temperature that ranged between 600° F. and 640° F. The weight of the completed bonding interlayer was 3.2 oz/sq yd.

The product was laminated at 720° F. and 40 psi for 30 seconds. The final product weighed 52 oz/sq yd, was 0.044 inches in thickness and had estimated warp×fill tensile strengths of 1100 lb/in×942 lb/in. The tensile strength of the resulting laminate was dictated predominantly by the combined tensile strengths of the TEXCOAT 700 product and the Style 2025 fiberglass fabric, with the bonding interlayer making a comparatively insignificant contribution.

EXAMPLE 2

A style 2035 fiberglass fabric having a greige weight of 33.0 oz/sq yd, and warp×fill tensile strengths of 250 lb/in×500 lb/in, available from JPS Glass Fabrics, was laminated on one side to an interior surface of a black PTFE film having a thickness of 0.004 inches, available from Garloc Plastomers of Newtown, Pa. The exterior surface of the PTFE film was in turn laminated to a TEXCOAT 300 Expansion Joint Material available from Textiles Coated, Inc. The bonding of the style 2035 fiberglass fabric to the interior surface of the PTFE film was effected by the bonding interlayer of Example 1. A direct bond was effected between the TEXCOAT 300 product and the PTFE film, without the interposition of a bonding interlayer therebetween.

The TEXCOAT 300 product is a woven fiberglass material including fluoropolymer resins, typically having the following properties: weight 19.0 oz/sq yd, thickness 0.014 inches, and warp×fill tensile strengths of 325 lb/in×275 lb/in.

The product was laminated at 720° F. and 40 psi for 30 seconds. The final product weighed 61 oz/sq yd, was 0.070 inches in thickness and had estimated warp×fill tensile strengths of 675 lb/in×817 lb/in. The tensile strength of the resulting laminate was dictated predominantly by the combined tensile strengths of the TEXCOAT 300 product and the Style 2035 fiberglass fabric, with the PTFE film and the bonding interlayer making comparatively insignificant contributions.

EXAMPLE 3

A ¼ inch Insulbatte/Tempmat Bonded Glass Fiber Mat, style 1006, available from JPS Glass Fabrics was laminated on one side to an interior surface of the PTFE film of Example 2. The exterior surface of the PTFE film was in turn laminated to a TEXCOAT 1400 product available from Textiles Coated, Inc. The bonding of the style 1006 Insulbatte Mat to the interior surface of the PTFE film was effected by the bonding interlayer of Example 1. The TEXCOAT 1400 product was bonded to the PTFE film as described in Example 2.

The product was laminated at 720° F. and 40 psi for 30 seconds. The final product weighed 86 oz/sq yd, was 0.25 inches in thickness and had estimated warp×fill tensile strengths of 1300 lb/in×1242 lb/in. The tensile strength of the resulting laminate was dictated predominantly by the tensile strength of the TEXCOAT 1400 product.

EXAMPLE 4

A ½ inch Insulbatte/Tempmat Bonded Glass Fiber Mat, style 1050, available from JPS Glass Fabrics was laminated to an interior surface of the PTFE film of Example 2. The exterior surface of the PTFE film was in turn laminated to the TEXCOAT 1400 product of Example 3. The bonding of the style 1050 Insulbatte Mat to the interior surface of the PTFE film was effected by the bonding interlayer of Example 1. The TEXCOAT 1400 product was bonded to the PTFE film as described in Example 2.

The product was laminated at 720° F. and 40 psi for 30 seconds. The final product weighed 105 oz/sq yd, was 0.40 inches in thickness and had estimated warp×fill tensile strengths of 1300 lb/in×1242 lb/in. The tensile strength of the resulting laminate was dictated predominantly by that of the TEXCOAT 1400 product, with the combined tensile strengths of the bonding interlayer, the PTFE film and the style 1050 Insulbatte Mat being comparatively insignificant.

EXAMPLE 5

The Insulbatte Mat disclosed in Example 3 was laminated to an interior surface of the PTFE film of Example 2. The exterior surface of the PTFE film was in turn laminated to the TEXCOAT 1400 product of Example 3. The opposite second side of the Insulbatte Mat was laminated to a style 2200 fiberglass fabric having a greige weight of 60.0 oz/sq yd, and warp×fill tensile strengths of 460 lb/in×420 lb/in, available from Newtex Industries, Inc. of Victor, N.Y. The above four components were laminated together by means of two bonding interlayers, one on either side of the Insulbatte Mat. The bonding of the style 1006 Insulbatte Mat to the interior surface of the PTFE film was effected by the bonding interlayer of Example 1. The TEXCOAT 1400 product was bonded to the PTFE film as described in Example 2. The bonding of the style 1006 Insulbatte Mat to the style 2200 fiberglass fabric was effected by the bonding interlayer of Example 1.

The product was laminated at 720° F. and 40 psi for 30 seconds. The final product weighed 155 oz/sq yd, was 0.40 inches in thickness and had estimated warp×fill tensile strengths of 1860 lb/in×1704 lb/in. The tensile strength of the resulting laminate was dictated predominantly by the combined tensile strengths of the TEXCOAT 1400 product and the style 2200 fiberglass fabric.

EXAMPLE 6

A ½ inch Insulbatte/Tempmat Bonded Glass Fiber Mat, style 1050, available from JPS Glass Fabrics is laminated to an interior surface of the PTFE film of Example 2. The exterior surface of the PTFE film was in turn laminated to the TEXCOAT 1400 product of Example 3. The opposite second side of the Insulbatte Mat was laminated to the style 2200 fiberglass fabric of Example 5. The bonding of the style 1050 Insulbatte Mat to the interior surface of the PTFE film was effected by the bonding interlayer of Example 1. The TEXCOAT 1400 product was bonded to the PTFE film as described in Example 2. The bonding of the style 1050 Insulbatte Mat to the style 2200 fiberglass fabric was effected by the bonding interlayer of Example 1.

The product was laminated at 720° F. and 40 psi for 30 seconds. The final product weighed 169 oz/sq yd, was 0.50 inches in thickness and had estimated warp-$\times$fill tensile strengths of 1860 lb/in$\times$1704 lb/in. The tensile strength of the resulting laminate was dictated predominantly by the combined tensile strengths of the TEXCOAT 1400 product and the style 2200 fiberglass fabric, with the bonding interlayers, and the remaining components of the laminate having a significantly lesser combined tensile strength.

EXAMPLE 7

The Style 1006 Insulbatte Mat disclosed in Example 3 was laminated to an interior surface of the PTFE film of Example 2. The exterior surface of the PTFE film was in turn laminated to the TEXCOAT 1400 product of Example 3. The opposite second side of the Insulbatte Mat was laminated to the style 2025 fiberglass fabric of Example 1. Bonding to the first and second sides of the Insulbatte Mat was effected respectively by first and second bonding interlayers. The bonding of the style 1006 Insulbatte Mat to the interior surface of the PTFE film was effected by the bonding interlayer of Example 1. The TEXCOAT 1400 product was bonded to the PTFE film as described in Example 2. The bonding of the style 1006 Insulbatte Mat to the style 2025 fiberglass fabric was effected by a second bonding interlayer.

The second bonding interlayer was produced by coating an aqueous dispersion of the MFA (HYFLON MFA Latex) PFA of Example 1 onto the fiberglass scrim carrier element of the type described in Table A. The latex solids constituted 60% by weight. The coated carrier element was dried and sintered in a tower at a temperature ranging between 600° F. and 640° F. The weight of the resulting bonding interlayer was 3.0 oz/sq yd.

The product was laminated at 720° F. and 40 psi for 30 seconds. The final product weighed 107 oz/sq yd, was 0.25 inches in thickness and had estimated warp-$\times$fill tensile strengths of 1680 lb/in$\times$1512 lb/in. The tensile strength of the resulting laminate was dictated predominantly by the combined tensile strengths of the TEXCOAT 1400 product and the style 2025 fiberglass fabric, with the bonding interlayers, the PTFE film and the style 1006 Insulbatte Mat making comparatively insignificant contributions.

The carrier element 18 serves multi-functional roles in enabling the bonding interlayer 16 to efficiently achieve effective bonds. In the first instance, the carrier element provides the interlayer with the structural strength and integrity needed to withstand the rigors of conventional processing and handling. Thus, melt-bondable adhesives can be applied to the carrier element in minimum quantities sufficient to achieve the desired bond, without regard to structural and strength considerations.

Porous carrier elements can serve to selectively distribute the adhesive across the bonding interface in various patterns, thereby further minimizing the amount of adhesive required to effect the bond. For example, a woven porous carrier element can be uniformly coated, or its yarns can be coated while leaving the windows therebetween open, or the windows can be filled while leaving the yarns uncoated.

During lamination, as the adhesive of the bonding interlayer undergoes melting, the non-fluoroplastic carrier element acts as a stabilizer along the bond interface. When bonding lightweight highly compressible materials having fibrous irregular surfaces, such as for example certain fiberglass mats, the stabilizing effect of the carrier element at the bond interface can be particularly beneficial, particularly when laminating pressures are relaxed before the adhesive has had an opportunity to cool and resolidify.

The carrier element also serves as a fluid anchor tending to resist or impede migration of the adhesive away from the bond interface and into the valleys and voids of irregular or porous component surfaces. This, in combination with its stabilizing effect, is believed to be particularly beneficial when laminating porous compressible components.

Once lamination is completed, the carrier element assumes an entirely passive role, its presence no longer being of any consequence with regard to the intended function of the resulting laminate.

Those skilled in the art will appreciate that numerous modifications of the invention beyond those detailed above may be undertaken without departing from the scope of the invention, and that bonding interlayers of the invention may be used to produce a wide variety of laminate composites.

I claim:

1. A laminated composite comprising:
   first and second components and a bonding interlayer interposed between said first and second components, said interlayer including a non-fluoroplastic textile carrier element coated with a fluoroplastic which melts under conditions of elevated temperature and pressure to effect a bond between said first and second components, the tensile strength of said carrier element being less than the combined tensile strengths of said first and second components.

2. The composite as claimed in either of claim 1, wherein said carrier element has a weight of less than about 6 ounces per square yard.

3. The composite as claimed in claim 2, wherein said fluoroplastic coating has a weight ranging from 1 to 10 ounces per square yard.

4. The composite as claimed in claim 1, wherein at least one of said first and second components is chemically resistant.

5. The composite as claimed in claim 1, wherein at least one of said components is heat resistant at temperatures ranging up to about 1200° F.

6. The composite as claimed in claim 1, wherein at least one of said components comprises a fluoroplastic film.

7. The composite as claimed in claim 6, wherein the fluoroplastic of said film is different from the fluoroplastic coating on said carrier element.

8. The composite as claimed in claim 1, wherein said first element includes a polytetrafluoroethylene film.

9. The composite as claimed in claim 1, wherein said second element includes uncoated fiberglass.

10. The composite as claimed in claim 1, wherein said bonding interlayer includes perfluoroalkoxy resin.

11. The composite as claimed in claim 1, wherein said bonding interlayer includes a fluorinated ethylene propylene copolymer.

12. A method of laminating comprising the steps of:
coating a non-fluoroplastic carrier element with a fluoroplastic which melts under conditions of elevated temperature and pressure;

interposing said coated carrier element between a first component which includes a non-fluoroplastic substrate having a tensile strength greater than the tensile strength of said carrier element, and a second component; and applying heat and pressure to form a laminate of the first and second components to effect a bond between said first and second components.

* * * * *